United States Patent
Hövelmann et al.

(10) Patent No.: US 12,479,957 B2
(45) Date of Patent: Nov. 25, 2025

(54) ETHOXYLATED GLYCEROL ESTERS AND METHOD FOR THE PRODUCTION THEREOF

(71) Applicant: Clariant International Ltd., Muttenz (CH)

(72) Inventors: Felix Hövelmann, Mühldorf (DE); Hannah Benson, Heppenheim (DE); Dirk Leinweber, Kelkheim (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 1030 days.

(21) Appl. No.: 17/614,209

(22) PCT Filed: May 26, 2020

(86) PCT No.: PCT/EP2020/064544
§ 371 (c)(1),
(2) Date: Nov. 24, 2021

(87) PCT Pub. No.: WO2020/239750
PCT Pub. Date: Dec. 3, 2020

(65) Prior Publication Data
US 2022/0259375 A1     Aug. 18, 2022

(30) Foreign Application Priority Data

May 28, 2019   (EP) ..................... 19177001

(51) Int. Cl.
*C08G 65/26*     (2006.01)
*B01J 31/04*     (2006.01)
(Continued)

(52) U.S. Cl.
CPC .......... *C08G 65/2615* (2013.01); *B01J 31/04* (2013.01); *B01J 37/04* (2013.01); *C07C 67/26* (2013.01);
(Continued)

(58) Field of Classification Search
CPC ........... C08G 65/2615; C08G 65/2651; C08G 65/269; B01J 31/04; B01J 37/04;
(Continued)

(56) References Cited

U.S. PATENT DOCUMENTS 2,917,470 A   12/1959  Bressler
4,775,653 A   10/1988  Leach
(Continued)

FOREIGN PATENT DOCUMENTS

AU   2013293942 A1   2/2015
AU   2013293942 B2   9/2016
(Continued)

OTHER PUBLICATIONS

Co-Pending U.S. Appl. No. 17/614,279.
(Continued)

*Primary Examiner* — Rabon A Sergent

(57) ABSTRACT

Disclosed herein is a method for preparing ethoxylated glycerol esters (formula (I)) by reacting ethylene oxide with triglycerides (formula (II)) using a calcium catalyst. The catalyst is formed from calcium hydroxide (A), a $C_3$-$C_{40}$ carboxylic acid (B) (formula (III)), and a strong acid (AC) (pKa≤3) derived from sulfur or phosphorus oxides. In formulae (I) and (II), $R_1$-$R_3$ are $C_7$-$C_{24}$ alkyl chains, with ethoxylation units (m+n+o) averaging>5. In formula (III), $R^4$ is selected from saturated or unsaturated, linear or branched $C_1$-$C_{30}$ alkyl chains, and $R^5$, $R^6$, $R^7$, and $R^8$ are hydrogen. The calcium hydroxide: carboxylic acid ratio (A):(B) is 1:1-1:5, while calcium hydroxide: strong acid ratio (A):(AC) is 5:1-1:1.

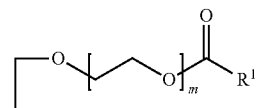
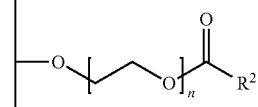
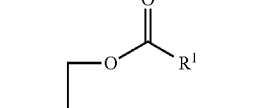
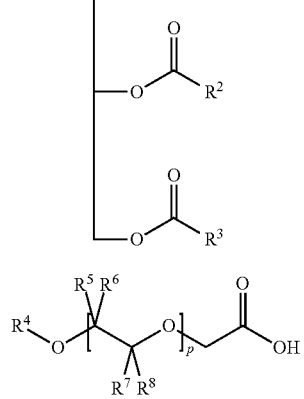

16 Claims, No Drawings

(51) Int. Cl.
  *B01J 37/04* (2006.01)
  *C07C 67/26* (2006.01)
  *C07C 69/30* (2006.01)
  *C07C 69/52* (2006.01)
  *C11C 3/00* (2006.01)

(52) U.S. Cl.
  CPC .............. *C07C 69/30* (2013.01); *C07C 69/52* (2013.01); *C08G 65/2651* (2013.01); *C08G 65/269* (2013.01); *C11C 3/006* (2013.01); *B01J 2231/14* (2013.01); *B01J 2531/004* (2013.01)

(58) Field of Classification Search
  CPC . B01J 2231/14; B01J 2531/004; C07C 67/26; C07C 69/30; C07C 69/52; C11C 3/006
  See application file for complete search history.

(56) References Cited

U.S. PATENT DOCUMENTS

| | | | |
|---|---|---|---|
| 4,820,673 A | 4/1989 | Knopf | |
| 4,835,321 A | 5/1989 | Leach | |
| 5,386,045 A | 1/1995 | Aeschbacher | |
| 5,600,020 A | 2/1997 | Wehle | |
| 5,627,121 A | 5/1997 | Lin | |
| 5,840,995 A | 11/1998 | Mayer | |
| 5,998,355 A | 12/1999 | Brumbaugh | |
| 6,239,091 B1 | 5/2001 | Tartakovsky | |
| 6,365,541 B1 | 4/2002 | Wimmer | |
| 9,056,828 B2 | 6/2015 | Kolano | |
| 2005/0240064 A1 | 10/2005 | Weerasooriya | |
| 2008/0249330 A1 | 10/2008 | Smith | |
| 2010/0160204 A1 | 6/2010 | Zipfel | |
| 2013/0316939 A1* | 11/2013 | Moragas Arjant | C11D 3/046 510/237 |
| 2018/0105770 A1 | 4/2018 | Acikalin | |
| 2018/0243730 A1 | 8/2018 | Niikura | |

FOREIGN PATENT DOCUMENTS

| | | |
|---|---|---|
| CA | 2762583 A1 | 6/2013 |
| CN | 1071413 A | 4/1993 |
| CN | 1207760 A | 2/1999 |
| CN | 1320950 C | 6/2007 |
| CN | 104508106 A | 4/2015 |
| DE | 605973 | 11/1934 |
| DE | 3914131 A1 | 10/1990 |
| DE | 10032612 A1 | 2/2002 |
| EP | 0077588 A1 | 4/1983 |
| EP | 0361621 | 4/1990 |
| EP | 0453967 | 10/1991 |
| EP | 0289159 B1 | 12/1992 |
| EP | 1045021 A1 | 10/2000 |
| EP | 1757676 A1 | 2/2007 |
| EP | 1919616 | 5/2008 |
| EP | 2029711 | 3/2009 |
| EP | 2125681 | 12/2009 |
| EP | 2181763 A1 | 5/2010 |
| EP | 2446743 A1 | 5/2012 |
| EP | 2633008 | 9/2013 |
| EP | 2666848 A1 | 11/2013 |
| EP | 3157674 | 4/2017 |
| GB | 1233299 | 5/1971 |
| JP | S641794 A | 1/1989 |
| JP | 2023048801 | 4/2023 |
| PL | 166429 | 5/1995 |
| WO | 9304030 A1 | 3/1993 |
| WO | 9718284 A2 | 5/1997 |
| WO | 0238269 A1 | 5/2002 |
| WO | 2005075621 A1 | 8/2005 |
| WO | 2005097963 A1 | 10/2005 |
| WO | 2006025898 | 3/2006 |
| WO | 2007073801 A1 | 7/2007 |
| WO | 2012042001 A1 | 4/2012 |
| WO | 2013154189 | 10/2013 |
| WO | 2014017564 A1 | 1/2014 |
| WO | 2015163347 | 10/2015 |
| WO | 2022010906 | 1/2022 |

OTHER PUBLICATIONS

Co-Pending U.S. Appl. No. 17/614,209.
Furukawa, J., & Saegusa, T. (1963). Polymerization of Aldehydes and Oxides. Wiley-Interscience, New York, 86 pages.
International Search Report and Written Opinion issued in App. No. PCT/EP2020/064564, mailing date Nov. 17, 2020, 18 pages.
M. Raii et al., "Rheological Behavior of Gypsum, Plaster, and Hydroxyapatite Gel Blends," Ind. Eng. Chem. Res., 51(34), 11163-69 (2012).
N. Osterwalder et al., "Preparation of nano-gypsum from anhydrite nanoparticles: Strongly increased Vickers hardness and formation of calcium sulfate nano-needles," J. Nanoparticle Res., 9, 275-281 (2007).
International Search Report and Written Opinion for App. No. PCT/EP2020/064544, mailing date Jul. 27, 2020, 15 pages.

* cited by examiner

ETHOXYLATED GLYCEROL ESTERS AND METHOD FOR THE PRODUCTION THEREOF

The present invention relates to the use of a specific type of calcium catalyst for the preparation of alkoxylated glycerol esters, alkoxylated glycerol esters prepared in the presence of such catalyst and a process for the preparation of the alkoxylated glycerol esters.

Alkoxylated esters of fatty acids are known in the literature as surfactants in different fields, such as home care, cosmetics, textile and other industries. Often, the preparation of such alkoxylated esters takes place in the presence of catalysts. Commonly employed catalysts are, e.g., sodium hydroxide/alcohol mixtures or sodium alkoxides.

DE-A 3 914 131 discloses the use of magnesium/aluminum salts as catalysts in the preparation of alkoxylated fatty acid esters. In U.S. Pat. No. 4,820,673 a calcium-based catalyst for the alkoxylation of organic compounds, such as fatty alcohols, is described. U.S. Pat. No. 4,835,321 provides a calcium/aluminum based catalyst for the synthesis of alkoxylated fatty alcohols.

U.S. Pat. No. 5,386,045 discloses the use of catalyst prepared from an alkoxylated alcohol, a calcium-containing compound, a metal alkoxide of a Lewis acidic metal and an inorganic acid compound, or a catalyst prepared from a calcium-containing compound and a specific activator, for the preparation of alkoxylated fatty acid esters of mono-, di- or trialcohols.

One object of the present invention is to provide ethoxylated glycerol esters with a particularly low degree of decomposition, characterized by a low amount of free hydroxyl groups.

It has now been surprisingly found that a specific type calcium catalyst is particularly useful for reaching this objective.

The present invention therefore provides the use of a catalyst (C), obtainable by a reaction involving:
(A) calcium hydroxide and
(B) a carboxylic acid, comprising 3 to 40 carbon atoms, for the preparation of ethoxylated glycerol esters of general formula (I), from ethylene oxide and one or more triglycerides,

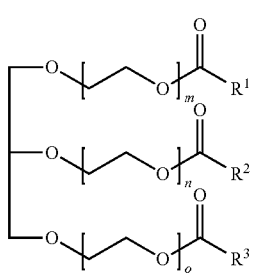

wherein $R^1$, $R^2$ and $R^3$ are equal or different and are independently selected from saturated or unsaturated, linear or branched alkyl chains with 3 to 40 carbon atoms; and
m, n and o are equal or different and are each independently an integer number, with the proviso that the number average of the sum of m+n+o is at least 3,
wherein the molar ratio of calcium hydroxide (A) and carboxylic acid (B) in the preparation of the catalyst (C) is from 1:1 to 1:5.

The invention further provides ethoxylated glycerol esters of general formula (I)

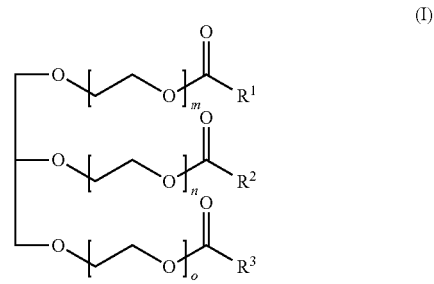

prepared from ethylene oxide and one or more triglycerides of formula (II)

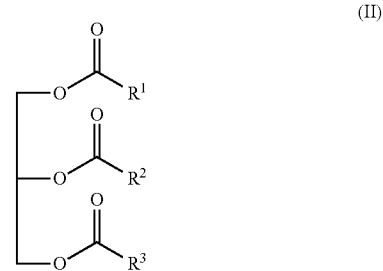

in the presence of the calcium catalyst (C) as defined above, characterized in that $R^1$, $R^2$ and $R^3$ in formulae (I) and (II) are equal or different and are independently selected from saturated or unsaturated, linear or branched $C_7$-$C_{24}$ alkyl chains; m, n and o in formula (I) are equal or different and are each independently an integer number from 1 to 200 with the proviso that the number-average of the sum of m+n+o is greater than 5.

While m, n and o are integer numbers in the formulae the products described often are mixtures of various components.

The invention further provides a method for preparing ethoxylated glycerol esters of formula (I),

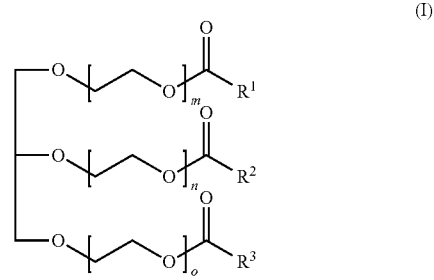

comprising the steps of
i) introducing the catalyst (C) as defined above and a triglyceride of formula (II)

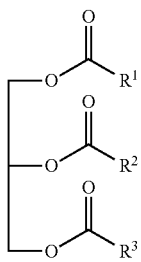

(II)

into a pressure-resistant reactor;
ii) optionally replacing the air in the reactor with nitrogen or other protecting gas;
iii) optionally drying the reactor content at a temperature of from 50 to 200° C. and/or a pressure below 0.8 bar;
iv) heating the content of the reactor to a temperature of from 80° C. to 200° C.;
v) optionally pressurizing the reactor with nitrogen or other protecting gas to a pressure of from 0.3 bar to 3.5 bar above atmospheric pressure.
vi) pressurizing the reactor with ethylene oxide gas to a pressure of from 1.5 bar to 10 bar above atmospheric pressure with the proviso that the pressure is above the pressure prior to step vi);
vii) allowing the mixture to react until the pressure in the reactor is constant;
wherein $R^1$, $R^2$ and $R^3$ in formulae (I) and (II) are equal or different and are independently selected from saturated or unsaturated, linear or branched $C_7$-$C_{24}$ alkyl chains;
m, n and o in formula (I) are equal or different and are each independently an integer number from 1 to 200, with the proviso that the number-average of the sum of m+n+o is greater than 5.

Another aspect of the present invention is the use of an ethoxylated glycerol ester as described above in compositions for dishwashing.

It was surprisingly found that, in the presence of the above-mentioned calcium catalyst (C), the alkoxylation reaction requires a significantly smaller amount of time than in the presence of catalysts known in the art. Furthermore, it was found that the ethoxylated glycerol esters prepared in the presence of calcium catalyst (C) lead to more homogeneous products with significantly lower hydroxyl values, smaller amounts of decomposition products and improved processability in view of ethoxylated glycerol esters known in the art.

The calcium catalyst (C) used according to the invention for the preparation of ethoxylated glycerol esters can be obtained in a reaction involving:
(A) calcium hydroxide $Ca(OH)_2$ and
(B) a carboxylic acid comprising 3 to 40 carbon atoms.

In this reaction, the molar ratio of calcium hydroxide (A) and the carboxylic acid (B) comprising 3 to 40 carbon atoms is from 1:1 to 1:5. Preferably, the molar ratio (A):(B) is from 1:1.5 to 1:4, more preferably from 1:1.8 to 1:2.2, even more preferably 1:1.9 to 1:2.1. In a particularly preferred embodiment, the ratio of (A):(B) in the preparation of the catalyst (C) is approximately 1:2.

The reaction for the preparation of the catalyst (C) is preferably carried out in the presence of at least one polar solvent, more preferably a polar solvent comprising at least one hydroxyl group, even more preferably at least one alcohol having 1 to 5 carbon atoms or a mixture thereof with water. In a particularly preferred embodiment the polar solvent is propan-2-ol or a mixture thereof with water. In another particularly preferred embodiment the polar solvent is ethanol or a mixture thereof with water.

The acid used as the carboxylic acid (B) comprising 3 to 40 carbon atoms is preferably a carboxylic acid represented by formula (III) or formula (IV).

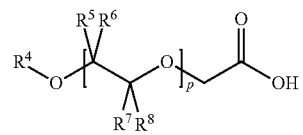

(III)

(IV)

In formula (III) $R^4$ is typically selected from saturated or unsaturated, linear or branched $C_1$-$C_{30}$ alkyl groups, preferably $C_5$-$C_{20}$ alkyl groups, more preferably $C_8$-$C_{18}$ alkyl groups. $R^5$, $R^6$, W and $R^8$ in formula (III) are equal or different and are independently selected from the group consisting of hydrogen, methyl and ethyl. Preferably $R^5$, $R^6$, $R^7$ and $R^8$ are hydrogen.

Moreover, p in formula (III) is an integer number from 0 to 20, preferably an integer number from 1 to 20, preferably an integer number from 1 to 11, more preferably an integer number from 2 to 5. In a preferred embodiment, in the carboxylic acid of formula (III) $R^4$ is a saturated or unsaturated, linear or branched $C_8$-$C_{18}$ alkyl group, $R^5$, $R^6$, $R^7$ and $R^8$ are hydrogen and p is an integer number from 1 to 11.

In a further preferred embodiment, in the carboxylic acid of formula (III) $R^4$ is a saturated or unsaturated, linear or branched $C_8$-$C_{18}$ alkyl group, $R^5$, $R^6$, $R^7$ and $R^8$ are hydrogen and p is an integer number from 2 to 5.

In formula (IV) $R^9$ is selected from saturated or unsaturated, linear or branched $C_5$-$C_{30}$ alkyl group, preferably $C_8$-$C_{18}$ alkyl group, more preferably $C_8$-$C_{12}$ alkyl group. In a particularly preferred embodiment, the carboxylic acid of formula (IV) is iso-nonanoic acid.

More preferably, the carboxylic acid (B) comprising 3 to 40 carbon atoms is a carboxylic acid represented by formula (III), especially wherein $R^4$ is a saturated or unsaturated, linear or branched $C_8$-$C_{18}$ alkyl group, $R^5$, $R^6$, $R^7$ and $R^8$ are hydrogen and p is an integer number from 2 to 5.

It is advisable to perform the reaction for obtaining the catalyst (C) in the presence of an acid (AC) which has a $pK_A$ value of 3 or less, preferably 2 or less, preferably 0 or less, and often −3 or less.

Preferably, the acid (AC) is selected from the group consisting of acids of sulfur oxides and phosphorus oxides, more preferably from the group consisting of sulfuric acid, sulfurous acid, sulfonic acids (such as methane sulfonic acid), phosphorus acid, phosphorous acid and phosphonic acids (such as methane phosphonic acid). Sulfuric acid, sulfurous acid and methane sulfonic acid are of particular interest.

In a particularly preferred embodiment, the reaction by which the catalyst (C) is obtained is carried out in the presence of sulfuric acid.

Preferably, the acid (AC) is used in the reaction thus that the molar ratio of the calcium hydroxide (A) to the acid (AC)

is from 5:1 to 1:1, more preferably from 3:1 to 1:1, even more preferably from 2:1 to 1:1.

It is particularly advantageous to prepare the calcium catalyst (C) by first allowing the calcium hydroxide (A) to react with the carboxylic acid (B), preferably in a solvent as described above, after which the reaction mixture is further treated with the acid (AC).

For the reaction by which the calcium catalyst (C) is obtained, any common reactor may be employed, preferably a reactor with an agitating/mixing means, such as, e.g., a magnetic stirrer, a mechanical stirrer, a static mixer, a blender or a batch disperser. Preferably, the mixing of the components is carried out using a batch disperser.

The preparation of the catalyst (C) is preferably carried out under a pressure of from 0.5 to 2 bar, more preferably from 0.8 to 1.5 bar, even more preferably from 0.9 to 1.2 bar. In a preferred embodiment, the catalyst is prepared under atmospheric pressure. Furthermore, the catalyst (C) is preferably prepared at a temperature of from −30° C. to 80° C., preferably from −10° C. to 60° C., more preferably from 0° C. to 50° C. In a preferred embodiment, the catalyst is prepared at a temperature of from 20 to 40° C., especially at room temperature.

The thus prepared calcium catalyst (C) typically has a content pf $Ca^{2+}$ ions that is between 0.5 wt-% and 5 wt-%, often from 1 to 4 wt-%, often from 2 to 3 wt-%. Optionally, the catalyst may be rid of volatile components, such as the solvent, water and other volatile byproducts by employing commonly used methods. Preferably, the volatile components are removed in vacuo, e.g. under a pressure below 0.8 bar, preferably below 0.3 bar, more preferably below 0.1 bar, and/or at elevated temperatures, e.g. 50 to 180° C., preferably 70 to 150° C., more preferably 80 to 120° C.

In a particularly preferred embodiment, the volatile compounds are removed on a rotary evaporator at a pressure below 0.1 bar and a temperature of from 80° C. to 120° C.

The ethoxylated glycerol ester of the invention in particular is an ethoxylated glycerol ester of formula (I)

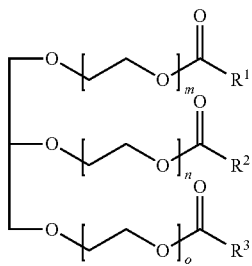

(I)

and is prepared from ethylene oxide and one or more triglycerides of formula (II)

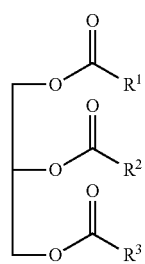

(II)

in the presence of the calcium catalyst (C) as defined above.

$R^1$, $R^2$ and $R^3$ in formula (I) of the ethoxylated glycerol ester of the invention and in the one or more triglycerides of formula (II) from which the ethoxylated glycerol ester of the invention is prepared, are equal or different and are independently selected from saturated or unsaturated, linear or branched $C_7$-$C_{24}$ alkyl chains, preferably $C_9$-$C_{20}$ alkyl chains, more preferably $C_{12}$-$C_{18}$ alkyl chains.

m, n and o in formula (I) of the ethoxylated glycerol ester of the invention are each independently an integer number from 1 to 200, preferably 1 to 80, more preferably 2 to 70, with the proviso that the number-average of the sum of m+n+o is greater than 5, preferably greater than 8, more preferably 8 to 200, even more preferably 8 to 80, calculated from the saponification value measured according to DIN EN ISO 3681.

The one or more triglycerides of formula (II) are not particularly limited and may be natural triglycerides or synthetic triglycerides. Preferably the triglycerides do not contain any free hydroxyl groups.

The hydroxyl value of the ethoxylated glycerol ester of the invention, prepared in the presence of the above defined catalyst (C), measured according to DIN EN ISO 4629-2 is typically less than 6 mg KOH/g above the hydroxyl value of the one or more triglycerides of formula (II).

Often, the hydroxyl value of the ethoxylated glycerol ester of the invention is in total below 7 mg KOH/g, preferably below 6 mg KOH/g, more preferably below 5 mg KOH/g. Furthermore, the ratio of $CH_2OH$ groups to alkyl-$CH_3$ groups in the ethoxylated glycerol ester of the invention is typically below 0.15, preferably below 0.12, more preferably below 0.08, even more preferably below 0.06, measured as the ratio of the integrals of corresponding signals in Proton-NMR spectra. In a particularly preferred embodiment, the hydroxyl value of the ethoxylated glycerol ester of the invention is below 7 mg KOH/g and the ratio of $CH_2OH$ groups to alkyl-$CH_3$ groups of the ethoxylated glycerol ester of the invention is below 0.12. In a particularly more preferred embodiment, the hydroxyl value is below 5 mg KOH/g and the ratio of $CH_2OH$ groups to alkyl-$CH_3$ groups is below 0.06.

Preferably, the saponification value of the ethoxylated glycerol ester of the invention is below 220 mg KOH/g, more preferably below 150 mg KOH/g.

The method of the invention for preparing an ethoxylated glycerol ester as described above comprises the steps of
  i) introducing the catalyst (C) as defined above, and one or more triglycerides of formula (II) as described above, into a pressure-resistant reactor;
  ii) optionally replacing the air in the reactor with nitrogen or other protecting gas;
  iii) optionally drying the reactor content at a temperature of from 50 to 180° C. and/or a pressure below 0.8 bar;
  iv) heating the content of the reactor to a temperature of from 80° C. to 200° C.;
  v) optionally pressurizing the reactor with nitrogen or other protecting gas to a pressure of from 1.3 to 3.5 bar;
  vi) pressurizing the reactor with ethylene oxide to a pressure of from 1.5 bar to 10 bar with the proviso that the pressure is above the pressure prior to step vi); and
  vii) allowing the mixture to react until pressure in the reactor is constant.

In step i) the catalyst (C) may be introduced as obtained from the reaction of its preparation described above directly, or in its form that has been rid of volatile compounds. The triglycerides of formula (II) may be introduced in their raw form or may be purified prior to use. Preferably, the triglycerides of formula (II) are purified prior to use, thus that traces of diglycerides, monoglycerides, free glycerol and other impurities are separated from the starting material.

The calcium catalyst (C) is preferably introduced into the reactor in an amount of from 0.1 to 5 wt-%, preferably from 0.2 to 3 wt-%, more preferably from 0.3 to 2 wt-% based on the total weight of the mixture of triglyceride of formula (II) and ethylene oxide.

The pressure-resistant reactor is not particularly limited but is designed to withstand the pressures employed in the process, thus that it is not damaged during the process. Preferably, the reactor is designed to withstand pressures both above 10 bar, more preferably above 15 bar, and below 0.01 bar, more preferably below 0.001 bar. Preferably, the pressure-resistant reactor is an autoclave, more preferably an autoclave equipped with an agitating means such as a magnetic or a mechanical stirrer.

Generally, the replacement of air in the reactor with nitrogen or other protecting gas is not necessarily required, because the ethoxylated glycerol ester of the invention would at least partially be generated in the process. However, air, particularly oxygen, in the reactor may lead to safety concerns during alkoxylation reactions in general and decomposition products due to oxidation and/or hydrolysis of the employed materials and of the generated products, especially at elevated temperatures. Therefore, it is advisable to carry out step ii) of the method of the invention after step i).

In general, the step of drying the reactor content is also not necessarily required, because the ethoxylated glycerol ester of the invention would at least partially be generated in the process. However, water and alcohols may facilitate hydrolysis and transesterification of the employed materials and of the generated products under the reaction conditions. Especially if in step i) the calcium catalyst (C) is introduced into the reactor as obtained from the reaction of its preparation described above directly, it is advisable to carry out the drying step, since the directly obtained catalyst (C) typically contains residues of polar solvents or their mixtures with water. In case the calcium catalyst (C) is rid of volatile components before introducing it into the reactor, the drying step iii) may be omitted. Nevertheless, in this case it may be advisable to carry out step iii), since volatile components may also be present as impurities in the one or more triglycerides of formula (ii). Therefore, in particularly preferred embodiments, step iii) is carried out.

The step iii) of drying the reactor content is typically performed at a temperature of from 50° C. to 180° C., preferably from 60° C. to 150° C., preferably from 70° C. to 130° C., often from 80° C. to 120° C., and at a pressure below 0.8 bar, preferably below 0.1 bar, more preferably below 0.05 bar. The thus generated vacuum is preferably a dynamic vacuum.

The vacuum pump for generating the vacuum is not particularly limited; it is, however, preferable to use an aspirator for generating the vacuum. Furthermore, it is advisable to reduce the pressure and increase temperature in the reactor gradually to prevent boiling retardation. In a particularly preferred embodiment, the step of drying the reactor content is carried out at a temperature of from 80° C. to 120° C. and a pressure below 0.01 bar, preferably over a period of at least 15 minutes, more preferably over a period of at least 30 minutes, even more preferably over a period of at least 1 hour. It is particularly preferred to dry the content of the reactor to constant mass.

After the drying step iii) the fluid line between the vacuum pump and the reactor is interrupted, to ensure that the components added to the reactor after the drying remain in the reactor and are not directly withdrawn therefrom. Furthermore, it is preferable to compensate the vacuum in the reactor with nitrogen or other protective gas before carrying out the further steps, to reduce the risk of air entering the reactor Step iv) of heating the content of the reactor is generally performed at a temperature of from 80° C. to 200° C., preferably from 120° C. to 190° C., more preferably from 160° C. to 180° C. This temperature is maintained at least until step vi) is finished, preferably until step vii) is finished.

After setting the temperature in step iv), the reactor may be optionally pressurized in step v) with nitrogen or other protecting gas to a pressure of from 0.3 to 3.5 bar, preferably from 0.5 to 2.0 bar, preferably from 0.7 to 1.5 bar, more preferably from 0.8 to 1 bar above atmospheric pressure. By carrying out this step v), ethylene oxide introduced in the following step is diluted with the protective gas, thus that pressure-controlled dosage of ethylene oxide into the reactor is facilitated.

In step vi) the reactor is further pressurized with ethylene oxide to a total internal pressure of from 1.5 to 10 bar, preferably from 2 to 8 bar, more preferably from 3 to 6 bar, more preferably from 4 to 5 bar, with the proviso that the pressure in step vi) is above the pressure before step vi).

During step vii), after introduction of the intended amount of ethylene oxide, the ethylene oxide inlet is closed and the reaction is allowed to proceed until the pressure in the reactor is constant.

In the sense of the invention, the pressure is considered constant, if it does not change by more than 0.05 bar over a period of 15 min, preferably 30 min, more preferably 1 hour. It is particularly preferred that the pressure in the reactor does not change by more than 0.01 bar over a period of 1 hour.

Usually, the entire amount of ethylene oxide is added to the reactor and a constant pressure is obtained by the method of the invention within less than 1000 minutes, often within less than 800 minutes. In particularly preferred embodiments, constant pressure is obtained within less than 700 minutes. At this point, the reaction between ethylene oxide and the one or more triglycerides of formula (II) is considered to be finished.

After completion of step vii), it is advisable to remove residual ethylene oxide from the reactor before isolating the ethoxylated glycerol ester of the invention, in order to prevent any unwanted reactions with ethylene oxide from taking place after isolation of the product. Preferably, residual ethylene oxide is removed from the reactor by cooling the reactor content to a temperature of from 50 to 120° C., more preferably from 70 to 100° C., more preferably from 85 to 95° C., and employing a pressure of below 0.8 bar, preferably below 0.1 bar, more preferably below 0.05 bar. The thus generated vacuum is preferably a dynamic vacuum. The vacuum pump for generating the vacuum is not particularly limited; it is, however, preferable to use an aspirator for generating the vacuum. Removal of residual ethylene oxide under these conditions is preferably carried out for at least 10 minutes, preferably at least 30 minutes, more preferably at least 1 hour.

The method of isolation of the ethoxylated glycerol ester of the invention is not particularly limited. However, it is preferable to isolate the product at elevated temperatures, specifically at temperatures of from 50 to 120° C., preferably from 60 to 100° C., more preferably from 70 to 90° C. At these temperatures the ethoxylated glycerol ester of the invention is typically in a liquid state and has a sufficiently low viscosity, and therefore may be transferred out of the reactor more easily than in the solid state, e.g. by pouring the product out of the reactor or via a bottom valve, thereby minimizing the amount of residues in the reactor. Thus, the subsequent cleaning and maintenance of the reactor is also facilitated.

It has been surprisingly found that the method for preparing an ethoxylated glycerol ester according to the invention using the calcium catalyst (C) described above may be interrupted at any stage, and continued at a later point in time, without the reaction time being significantly increased. Contrary to this, interruption of the preparation method with catalysts known in the art requires substantially longer reactivation after the interruption, thus that the overall reaction time is increased by a greater amount of time.

It has moreover been observed that preparation methods employing catalysts known in the art lead to off-white solid residues in the reactor, which are not to be found if the specific type of calcium catalyst (C) is used. The following examples and claims further illustrate the invention in more detail.

EXAMPLES

Comparative Synthesis Example 1 Preparation of Calcium Catalyst of U.S. Pat. No. 5,386,045

A mixture of 125 g of alcohol ethoxylate (from $C_{10}/C_{12}$-fatty alcohol and 40 wt-% ethylene oxide; e.g. ALFONIC 1012-40 from Vista Chemical Company), 2 g of 2-ethylhexanoic acid, and 10.9 g of calcium hydroxide was stirred at room temperature under a nitrogen atmosphere in an autoclave, while 2 g of concentrated sulfuric acid were added over a period of 10 min. After complete addition of sulfuric acid, stirring was continued for 5 h. Subsequently, the mixture was heated to 150° C. and volatile components were removed in a stream of nitrogen over 15 min. The mixture was cooled to 125° C. and 17.5 g of aluminum trialkoxide (containing about 6 wt-% Al and with an average alkoxide carbon chain length of 10 carbon atoms) were added.

The mixture was stirred for additional 2 h at 125° C., after which the temperature was raised to 190° C. and volatile components were removed in a nitrogen stream. After an additional 0.5 hours at 190° C. the mixture was cooled to ambient temperature, providing a catalyst with a $Ca^{2+}$ content of around 3 wt-% and an $Al^{3+}$ content of around 0.6 wt-% (henceforth "(C-0)").

Comparative Synthesis Example 2 Preparation of Co-Catalyst (Glycerol Mono-Oleate)

A mixture of 9.2 g of glycerol and 28.2 g of oleic acid was heated to 175° C. and stirred at this temperature, while removing water with a dean-stark apparatus, until the acid value was <2 mg KOH/g.

Synthesis Example 1

Preparation of Calcium Catalyst (C) with Carboxylic Acid of Formula (III)
  a) A mixture of 1047.0 g of a carboxylic acid of formula (III) under the trade name "Emulsogen COL 050" marketed by Clariant Produkte (Deutschland) GmbH, 55.8 g of Calcium hydroxide and 360.6 g of propan-2-ol was agitated at ambient temperature for 5 min with a batch disperser (Ultra Turrax from IKA Werke GmbH & Co KG). After this, 44.2 g of concentrated sulfuric acid were added over two minutes and the mixture was again agitated for 5 min with the batch disperser, providing a catalyst with a $Ca^{2+}$ content of 2.00 wt-% (henceforth "(C-1)").
  Similar results for providing the catalyst with a $Ca^{2+}$ content of approximately 2.00 wt-% can be obtained by using methane-sulfonic acid or sulfurous acid instead of sulfuric acid.
  b) A mixture of 1047.0 g of a carboxylic acid of formula (III) under the trade name "Emulsogen COL 050" marketed by Clariant Produkte (Deutschland) GmbH, 55.8 g of Calcium hydroxide and 360.6 g of propan-2-ol was agitated at ambient temperature for 5 min with a batch disperser (Ultra Turrax from IKA Werke GmbH & Co KG). After this, 42.9 g of methanesulfonic acid (99 wt.-%) were added over two minutes and the mixture was again agitated for 5 min with the batch disperser, providing a catalyst with a $Ca^{2+}$ content of 2.00 wt-% (henceforth "(C-3)").
  c) A mixture of 1047.0 g of a carboxylic acid of formula (III) under the trade name "Emulsogen COL 050" marketed by Clariant Produkte (Deutschland) GmbH, 55.8 g of Calcium hydroxide and 360.6 g of propan-2-ol was agitated at ambient temperature for 5 min with a batch disperser (Ultra Turrax from IKA Werke GmbH & Co KG). After this, 603.7 g of sulfurous acid (6 wt.-%) were added over two minutes and the mixture was again agitated for 5 min with the batch disperser. The solvent mixture was removed under vacuum, providing a catalyst with a $Ca^{2+}$ content of approx. 2 wt-% (henceforth "(C-4)").
  Emulsogen COL 050 is a commercial product carboxylic acid (B) comprising, as main component, a carboxylic acid represented by formula (III) wherein $R^4$ is oleyl; $R^5$, $R^6$, $R^7$ and $R^8$ are hydrogen; and p is 5.

Synthesis Example 2

Preparation of Calcium Catalyst (C) with Carboxylic Acid of Formula (IV)

A mixture of 114 g isononanoic acid, 26.7 g calcium hydroxide, 346.38 g of propan-2-ol and 26.7 g water was agitated for 5 min with a batch disperser (Ultra Turrax from IKA Werke GmbH & Co KG). After this, 10.62 g of concentrated sulfuric acid were added in a single batch and the mixture was again agitated for 5 min with the batch disperser, providing a catalyst with a $Ca^{2+}$ content of 2.75 wt-% (henceforth "(C-2)").

Synthesis Example 3

General Alkoxylation Procedure

The triglyceride of formula (II), the catalyst and, if applicable, the co-catalyst, were placed into a glass autoclave, which was then flushed with nitrogen by alternatingly applying vacuum and introducing nitrogen (3 cycles). The mixture was dried under aspirator vacuum at 100° C. for 1 hour. The pressure in the autoclave was restored to ambient with nitrogen and heated to 175° C. At this temperature the autoclave was pressurized with nitrogen to a pressure of 0.8 bar above atmospheric pressure, after which pressure controlled dosage of ethylene oxide took place up to a maximum pressure of 4.5 bar above atmospheric pressure.

The ethoxylation is carried out in a semi-batch process with automated dosage of ethylene oxide within a given temperature window and up to the specified maximum pressure. The pressure is adjusted according to the increased filling volume of the vessel. After introduction of the intended amount of ethylene oxide and closing the ethylene oxide inlet, the reaction was continued until the pressure became constant.

The reactor content was cooled to 90° C. and aspirator vacuum was applied for 30 min in order to remove residual ethylene oxide. The temperature was reduced to 80° C. and the final product was transferred into storage vessels and analyzed. The typical batch scale was 400 g to 2000 g. The uptake of the intended amount of ethylene oxide is assured by gravimetry and by determination of the saponification value according to DIN EN ISO 3681.

The materials employed and reaction times to constant pressure in the synthesis example 3 are shown in the following Table 1 (molar equivalents):

Furthermore, after emptying the autoclave after the reaction employing catalyst (C-0), off-white solids were adhered to the stirrer and temperature sensor as well as in the reaction vessel. These solids were not observed when catalyst (C-1) or catalyst (C-2) were employed in the reaction.

In Table 2, the appearance of several comparative examples and inventive examples under different conditions is described.

TABLE 2

| Example No. | Temperature [° C.] | State | Appearance | Homogeneity |
|---|---|---|---|---|
| Ex. 1 | 25 | Liquid | turbid liquid | homogeneous |
| Comp. 1 | 25 | Liquid | turbid liquid, solid precipitate | inhomogeneous |

TABLE 1

| Example No. | Triglyceride (1 equivalent) | ethylene oxide amount [equivalents] | Catalyst | Catalyst amount [wt-%] | Co-catalyst amount [wt-%] | Reaction time [min] | Saponification value [mgKOH/g] |
|---|---|---|---|---|---|---|---|
| Comp. 1 | coconut oil | 12 | C-0 | 2.0 | — | 1100 | 145 |
| Comp. 2 | coconut oil | 12 | KOtBu | 1.15 | 2.0 | 720 | 137 |
| Ex. 1 | coconut oil | 12 | C-1 | 1.8 | — | 320 | 142 |
| Comp. 3 | coconut oil | 22.5 | C-0 | 2.0 | 1.5 | 1320 | 103 |
| Comp. 4 | coconut oil | 22.5 | KOtBu | 1.5 | 5.0 | 630 | 96.0 |
| Ex. 2 | coconut oil | 22.5 | C-1 | 1.3 | — | 330 | 104 |
| Comp. 5 | coconut oil | 60 | C-0 | 1.6 | — | 1950 | 55.2 |
| Ex. 3 | coconut oil | 60 | C-1 | 0.65 | — | 580 | 53.0 |
| Ex. 4 | coconut oil | 45 | C-1 | 0.8 | — | 440 | 67.3 |
| Comp. 6 | sunflower oil | 8 | C-0 | 2.0 | 1.5 | 1140 | 142 |
| Ex. 5 | sunflower oil | 8 | C-1 | 2.0 | — | 390 | 138 |
| Comp. 7 | sunflower oil | 40 | C-0 | 0.93 | 0.7 | 1500 | 60.1 |
| Comp. 8 | sunflower oil | 40 | KOtBu | 1.5 | 5.0 | 850 | 61.7 |
| Ex. 6 | sunflower oil | 40 | C-1 | 0.53 | — | 530 | 62.8 |
| Ex. 7 | sunflower oil | 12 | C-1 | 0.2 | — | 390 | 118 |
| Ex. 8 | sunflower oil | 60 | C-2 | 0.5 | — | 300 | 80.7 |
| Ex. 9 | abyssinian oil | 60 | C-1 | 0.4 | — | 500 | 49.0 |
| Ex. 10 | hydrogenated high eruca rapeseed oil | 88 | C-1 | 0.6 | — | 630 | 34.9 |
| Ex. 11 | rapeseed oil | 200 | C-1 | 0.5 | — | 660 | 17.2 |
| Comp. 9 | Trilaurin | 35 | C-0 | 2.0 | — | 2820 | 79.5 |
| Ex. 12 | Trilaurin | 35 | C-1 | 2.0 | — | 580 | 81.2 |
| Ex. 13 | sunflower oil | 45 | C-3 | 3.0 | — | 710 | 68.1 |
| Ex. 14 | sunflower oil | 45 | C-4 | 3.0 | — | 1220 | 69.0 |

An interruption of synthesis example 3 for 15 hours using C-0 resulted in the reaction being re-initiated at a significantly slower rate than the initiation of the reaction in the beginning. An interruption while using C-1 or C-2 resulted in the reaction restarting at essentially the same rate as observed directly before the interruption.

Furthermore, ethoxylation can also be performed with fatty alcohols, fatty acid alkyl esters, and fatty acid alkylene glycol diesters instead of triglycerides by using the same procedure with catalysts C-1 or C-2. Moreover, it is also possible to perform the ethoxylation of triglycerides, fatty alcohols, fatty acid alkyl esters, and fatty acid alkylene glycol diesters in the presence of additional glycerol, to obtain products with higher polarity due to a larger number of hydroxyl groups in the product.

From Table 1 it is evident that in the inventive examples, employing catalyst (C-1) or (C-2), the triglycerides reacted at a significantly higher rate than in the comparative examples employing catalyst (C-0) or KOtBu, optionally with glycerol monooleate as co-catalyst. The faster reaction rate is observed with any amount of ethylene oxide introduced and with any triglyceride employed.

TABLE 2-continued

| Example No. | Temperature [° C.] | State | Appearance | Homogeneity |
|---|---|---|---|---|
| Ex. 1 | 65 | Liquid | almost clear liquid | homogeneous |
| Comp. 1 | 65 | Liquid | turbid liquid, solid precipitate | inhomogeneous |
| Ex. 2 | 40 | Solid | colorless solid | homogeneous |
| Comp. 3 | 40 | Liquid | turbid liquid, solid precipitate | inhomogeneous |
| Ex. 2 | 65 | Liquid | almost clear | homogeneous |
| Comp. 3 | 65 | Liquid | almost clear liquid, solid precipitate | inhomogeneous |
| Ex. 3 | 25 | Solid | colorless solid | homogeneous |
| Comp. 5 | 25 | Solid | off-white and colorless solids | inhomogeneous |
| Ex. 3 | 65 | Liquid | clear liquid | homogeneous |
| Comp. 5 | 65 | Liquid | almost clear liquid, solid precipitate | inhomogeneous |

In Table 3, the hydroxyl values and ratios of $CH_2OH$ groups to alkyl-$CH_3$ groups of several inventive and comparative examples are shown.

Hydroxyl values were measured according to DIN EN ISO 4629-2. The ratios of $CH_2OH$ groups to alkyl-$CH_3$ groups were calculated from the integral ratios of the corresponding Proton-NMR signals using a Bruker NMR spectrometer with 400 MHz and $CDCl_3$ as a solvent.

The off-white solid residue from comparative examples employing (C-0) as catalyst was insoluble and was not be analyzed.

TABLE 3

| Example No. | OH-value [mg KOH/g] | $CH_2OH$/Alkyl-$CH_3$ ratio |
| --- | --- | --- |
| Comp. 1 | 7.6 | 0.06 |
| Comp. 2 | 28 | 0.23 |
| Ex. 1 | 4.0 | 0.02 |
| Comp. 3 | 15 | 0.13 |
| Comp. 4 | 41 | 0.38 |
| Ex. 2 | 3.1 | 0.03 |
| Comp. 5 | 6.6 | 0.12 |
| Ex. 3 | 2.7 | 0.04 |
| Ex. 4 | 4.6 | 0.04 |
| Comp. 6 | 8.9 | 0.19 |
| Ex. 5 | 3.1 | 0.02 |
| Ex. 10 | 4.6 | 0.05 |
| Comp. 9 | 11 | 0.13 |
| Ex. 12 | 5.5 | 0.07 |

From the OH values of the comparative and inventive examples it is evident, that the ethoxylated triglycerides of the inventive examples using catalyst (C-1) suffered less decomposition during the synthesis reaction than the ethoxylated triglycerides of the comparative examples using catalysts (C-0) or KOtBu.

In particular, saponification of the ester groups after ethoxylation appears to have taken place to a lesser extent, which is seen by the ratio of $CH_2OH$ groups derived from polyethoxy-OH, occurring from undesired side reactions (e.g. due to longer reaction times and high reaction temperature), to alkyl-$CH_3$ groups, derived from fatty acid alkyl.

The solubility of the ethoxylated triglycerides according to Ex. 2, Comp. 3 and Comp. 4 (each prepared from 1 molar equivalent of coconut oil and 22.5 molar equivalents of ethylene oxide) in water was examined by mixing 0.5 parts by weight of the respective ethoxylated triglyceride with 99.5 parts by weight of deionized water in a glass test tube at 25° C., and a visually evaluation of the clarity was made of the resulting composition, directly after mixing and 1 hour after mixing. In each case, the changes within the 1 hour period were not significant. The visual evaluation was done according to the following rating:

| | |
| --- | --- |
| Clear | no suspended matter observed |
| Almost clear | traces of suspended matter observed |
| Slightly turbid | suspended matter observed, dark background still visible |
| Turbid | suspended matter dominant, dark background hardly recognizable |
| Opaque | suspended matter very dominant, dark background not recognizable. |

The evaluation is shown in Table 4:

TABLE 4

| Sample obtained from | Directly after mixing | 1 hour after mixing |
| --- | --- | --- |
| Ex. 2 | slightly turbid | slightly turbid |
| Comp. 3 | Opaque | opaque |
| Comp. 4 | almost clear | almost clear |

From the above results it can be seen that the ethoxylated glycerol ester of the invention (Ex. 1) prepared with the catalyst C-1 has a significantly better solubility in water than the comparative product prepared with the catalyst C-0 known in the art (Comp. 3). This is important e.g. for the applicability of the product as a surfactant.

The improved solubility is observed despite the smaller amount of free hydroxyl groups, which is expected to facilitate dissolution in water due to higher polarity.

The differences are in accord with the formation of insoluble solid residues in the ethoxylation process employing catalyst C-0.

The increased solubility of the product prepared with KOtBu and a co-catalyst (Comp. 4) is a result of the large amount of OH group-bearing decomposition products, which increase the polarity of the mixture and thus the overall solubility of the composition in water.

Application Example 1: Drying Capacity and Clean Dishwasher Interior

The drying capacity of a detergent composition for machine dishwashing F2 comprising the ethoxylated glycerol ester of Ex. 4 was investigated. As a comparative example, the drying capacity of a comparative formulation F1 comprising a modified fatty alcohol ethoxylate was tested.

Testing Conditions:
  Dishwashing machine: Miele G 1222 SC GSL-2
  Testware dishes: 10 appetizer spoons
    10 appetizer forks
    10 teaspoons
    2 vegetable serving spoons
    12 drinking glasses
    10 porcelain cups
    25 porcelain plates
    3 SAN (poly-styrene-co-acrylonitrile) plates
    3 PP (polypropylene) plates
    6 PP bowls
  Dishwashing program: P4R0 without pre-rinsing
    main rinse at 50° C.
    final rinse at 65° C.
  Water hardness: 21° dH
  Wasser softening: none
  Detergent dosage: 18 g, added into the detergent tablet tray immediately after opening of the dosing chamber
  Contamination: 50 g frozen dirt, added immediately after opening of the dosing chamber
  Rinse aid: none
  Cleaning cycles: 4
  All items were treated once with demineralized water, Neodisher A 8, citric acid, and demineralized water.
Evaluation:
  Evaluation of the testware was begun 30 minutes after the dishwashing cycle was completed. During this time, the dishwasher door was closed. For each test, dishwashing cycles 2 to 4 were evaluated. The assessment was carried out in each case with an illumination of 1000-1500 lux.
  In a fixed order and with a set time limit, the number of adherent drops of residual water was counted for each testware item. Depending on the counted number of drops, the following rating of the drying capacity results for each testware item:
Rating for Porcelain, Stainless Steel and Glass:
  0 dry, no water drops
  1 1 water drop
  2 2 water drops 3 3 water drops
4 4 water drops
5 5 water drops
6 more than 5 water drops Rating for Plastics:
0 dry, no water drops
1 1 water drop
2 2 water drops
3 3 water drops
4 4 water drops
5 5 water drops
6 6 water drops
7 7 water drops
8 more than 7 water drops.

In this rating scheme, there is a score of 0 for best performance and a score of 6 for worst performance for each testware dish. For each dishwashing cycle 2, 3 and 4, the sum of the scores of all test dishes was formed. For comparison of the formulations F1 and F2, the average grade of all sums of the dishwashing cycles 2 to 4 was averaged in each case. This leads to a theoretical maximum value with the worst drying performance of 630 and a theoretical minimum value with the best drying performance of 0.

The results are shown in the following Table 5.

Furthermore, the fatty residues on plastic parts (filter, rinse aid chamber) of the dishwashing machine were evaluated (on a scale of 1 to 7, with 1 representing a large amount of residues and 7 representing no residues). These results are also shown in Table 5.

Compositions:

The compositions of the formulations F1 and F2 are shown in the following Table 5.

Application Example 2: Rinse Aiding Performance of Detergent Compositions for Machine Dishwashing The rinse aiding performance of the formulation F2 according to the invention was investigated. As comparative example, the rinse aiding performance of the comparative formulation F1 was tested.

Testing Conditions:
Dishwashing machine: Miele G 1222 SC GSL
Testware dishes: 6 drinking glasses (higher quality)
(8 material groups) 6 drinking glasses (lower quality)
  3 PP bowls
  3 melamine plates
  3 buffer dishes+4 knives (stainless steel; lower quality)
  4 knives (stainless steel; higher quality)
  3 porcelain plates (higher quality)
  3 porcelain plates (lower quality)
Dishwashing program: program 4, R=2 without pre-rinsing
  main rinse at 50° C.
  final rinse at 65° C.
Water hardness: 21° dH
Water softening: none
Detergent dosage: 18 g, added to the dosage chamber before starting the test
Contamination: 100 g frozen dirt, added immediately after the opening of the dosage chamber
Rinse aid: none
Cleaning cycles: 4

All testware dishes except for the PP bowls were treated once with demineralized water, Neodisher A 8, citric acid and again demineralized water.

Evaluation:

Evaluation of the testware was begun at least 60 minutes after opening the door of the dishwashing machine after completion of the dishwashing cycle. For each test, dishwashing cycles 2 to 4 were evaluated. The assessment was carried out according to the following rating:

Rinse aid effects considered for the visual rating:

| | |
|---|---|
| Stains | Stains of different size and intensity |
| Contact spots | Stains resultant from contact points between the testware dishes and parts of the dishwashing machine |
| Stripes | Rinse aid stripes |
| Film formation | continuous film spread uniformly on the testware dishes |
| Structured film formation | Dispersed torn film |
| Solid residues | Solid powder or crystalline residues |
| Fatty resudues | Fatty drops or fatty film formation |
| Iridescence | Shimmering, iridescence |

Visual Rating Marks:
10 Perfect
9 Perfect to barely visible
8 Barely visible
7 Barely visible to visible
6 Visible
5 Visible to disturbing
4 Disturbing
3 Disturbing to unacceptable
2 Unacceptable
1 Absolutely unacceptable The combination of the above listed eight rinse aid effects leads to a rating from 1 to 10 according to the above visual rating marks, wherein a rating of 1 represents the worst performance and a rating of 10 represents the best performance. For each of the above 8 testware material groups in each dishwashing cycle, an average rating was determined, followed by calculating the sum of ratings for all material groups in each individual dishwashing cycle, followed by determining an average rating for the entirety of dishwashing cycles 2 to 4. The resultant average rating was used as the final rinse aiding performance of the formulations F1 and F2. This leads to a theoretical maximum value of 80 for the best performance and a theoretical minimum value of 8 for the worst performance.

Compositions:

The compositions of the formulation F2 according to the invention and of F1 are shown in the following Table 5. The results are also shown in Table 5.

TABLE 5

Compositions, drying capacity, fatty residues and rinse aiding performance of formulations F1 and F2

| Component | F1 wt.-%*) | F2 wt.-%*) |
|---|---|---|
| trisodium citrate dihydrate | 28.5 | 28.5 |
| sodium carbonate | 19.5 | 19.5 |
| sodium silicate | 2.0 | 2.0 |
| MGDA-Na$_3$ | 15.0 | 15.0 |
| Polycarboxylate | 10.0 | 10.0 |
| sodium percarbonate | 9.0 | 9.0 |
| TAED | 2.0 | 2.0 |
| HEDP | 0.9 | 0.9 |
| Protease | 0.9 | 0.9 |
| Amylase | 0.9 | 0.9 |
| modified fatty alcohol ethoxylate | 3.5 | — |
| Coconut oil + 45 EO | — | 3.5 |

TABLE 5-continued

Compositions, drying capacity, fatty residues and
rinse aiding performance of formulations F1 and F2

| Component | F1 wt.-%*) | F2 wt.-%*) |
|---|---|---|
| sodium sulfate | 3.2**) | 3.2**) |
| drying capacity | 157 | 148 |
| rinse aiding performance | 56.9 | 57.3 |
| fatty residues | 4.0 | 6.1 |

*)The ingredients were added according to their active component content in wt.-%.
**)Sodium sulfate is added as a filler for a constant mass balance of the detergent composition, without a function and without influence on the preformance of the detergent composition.

From the results in the above Table 5 it is evident that the use of the detergent composition for machine dishwashing F2 leads to beneficial values of the drying capacity, fatty residues in the machine compartment and rinse aiding performance compared to composition F1.

Moreover, the formulation F2 shows an excellent cleaning performance and excellent filter cleaning properties.

The invention claimed is:

1. A method for preparing a mixture of ethoxylated glycerol esters of formula (I),

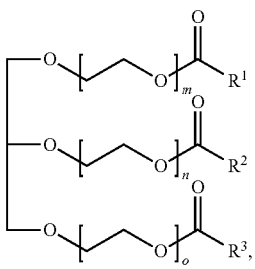
(I)

the method comprising bringing ethylene oxide and one or more triglycerides of formula (II),

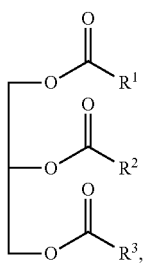
(II)

into contact with a calcium catalyst (C), wherein
$R^1$, $R^2$, and $R^3$ in formulae (I) and (II) are each independently selected from saturated or unsaturated, linear or branched $C_7$-$C_{24}$ alkyl chains,
m, n, and o in formula (I) are each independently an integer from 1 to 200, with the proviso that the number-average of the sum of m+n+o is greater than 5, and
the calcium catalyst (C) is obtainable by a reaction involving
(A) calcium hydroxide,
(B) a carboxylic acid represented by formula (III),

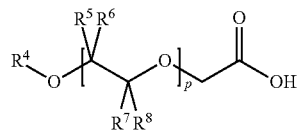
(III)

wherein
the carboxylic acid comprises 3 to 40 carbon atoms,
$R^4$ is selected from saturated or unsaturated, linear or branched
$C_1$-$C_{30}$ alkyl chains,
$R^5$, $R^6$, $R^7$, and $R^8$ are hydrogen, and
p is an integer number from 1 to 11; and
(AC) an acid selected from acids of sulfur oxides and phosphorus oxides and having a pKa value of 3 or less,
wherein
the calcium hydroxide (A) and the carboxylic acid (B) are present in a molar ratio (A):(B) of from 1:1 to 1:5; and
the calcium hydroxide (A) and the acid (AC) are present in a molar ratio (A):(AC) of from 5:1 to 1:1.

2. The method according to claim 1, wherein the method further comprises one or more of
introducing the one or more triglycerides of formula (II) and the calcium catalyst (C) into a pressure-resistant reactor;
replacing the air in the reactor with nitrogen or other protecting gas;
drying the reactor content at a temperature of from 50° C. to 200° C. and/or a pressure below 0.8 bar;
heating the content of the reactor to a temperature of from 80° C. to 200° C.;
pressurizing the reactor with nitrogen or other protecting gas to a pressure of from 0.3 bar to 3.5 bar above atmospheric pressure;
pressurizing the reactor with ethylene oxide gas to a pressure of from 1.5 bar to 10 bar above atmospheric pressure, with the proviso that the pressure after ethylene oxide addition is higher than the pressure prior ethylene oxide addition;
allowing the mixture to react until the pressure in the reactor is constant; and
cooling the mixture to a temperature of from 50 to 120° C. and removing residual ethylene oxide at a pressure below 0.8 bar.

3. The method according to claim 1, wherein the calcium catalyst (C) is present in an amount of 0.1 wt-% to 5 wt-%, based on the total weight of the one or more triglycerides of formula (II) and ethylene oxide.

4. The method according to claim 1, wherein the method further comprises:
introducing the one or more triglycerides of formula (II) and the calcium catalyst (C) into a pressure-resistant reactor;
optionally, replacing the air in the reactor with nitrogen or other protecting gas;
optionally, drying the reactor content at a temperature of from 50° C. to 200° C. and/or a pressure below 0.8 bar;
heating the content of the reactor to a temperature of from 80° C. to 200° C.;

optionally, pressurizing the reactor with nitrogen or other protecting gas to a pressure of from 0.3 bar to 3.5 bar above atmospheric pressure;

pressurizing the reactor with ethylene oxide gas to a pressure of from 1.5 bar to 10 bar above atmospheric pressure, with the proviso that the pressure after ethylene oxide addition is higher than the pressure prior ethylene oxide addition;

allowing the mixture to react until the pressure in the reactor is constant; and optionally, cooling the mixture to a temperature of from 50 to 120° C. and removing residual ethylene oxide at a pressure below 0.8 bar.

5. The method according to claim 1, wherein the reaction involving components (A), (B), and (AC) further involves an alcohol solvent having 1 to 5 carbon atoms, or a mixture thereof with water.

6. The method according to claim 5, further comprising removing the alcohol solvent before the calcium catalyst (C) is used to prepare the mixture of ethoxylated glycerol esters of formula (I).

7. The method according to claim 1, wherein the acid (AC) is selected from the group consisting of sulfuric acid, sulfurous acid, sulfonic acids, phosphorus acid, phosphorous acid, and phosphonic acids.

8. The method according to claim 1, wherein the acid (AC) is selected from the group consisting of sulfuric acid, sulfurous acid, and methane sulfonic acid.

9. The method according to claim 1, wherein the acid (AC) is sulfuric acid.

10. The method according to claim 1, wherein the content of $Ca^{2+}$ ions in the calcium catalyst (C) is between 0.5 wt-% and 5 wt-%.

11. The method according to claim 1, wherein m, n, and o in formula (I) are each independently an integer number from 1 to 80.

12. The method according to claim 1, wherein m, n, and o in formula (I) are each independently an integer number from 2 to 70.

13. The method according to claim 1, wherein the mixture of ethoxylated glycerol esters of formula (I) has a hydroxyl value of less than 7 mg KOH/g.

14. The method according to claim 1, wherein the mixture of ethoxylated glycerol esters of formula (I) has a hydroxyl value of less than 6 mg KOH/g.

15. The method according to claim 1, wherein the mixture of ethoxylated glycerol esters of formula (I) has a saponification value of less than 220 mg KOH/g.

16. The method according to claim 1, wherein the number-average of the sum of m+n+o is from 8 to 80.

* * * * *